Patented Apr. 1, 1952

2,591,415

UNITED STATES PATENT OFFICE 2,591,415

PROCESS FOR THE MANUFACTURE OF AROMATIC NITRILES

Rudolf Engelhardt, Leverkusen-Bayerwerk, Germany, and Hanns Arledter, Hamden, Conn., assignors to Farbenfabriken Bayer, Leverkusen, Germany No Drawing. Application July 12, 1949, Serial No. 104,384. In Germany November 26, 1948

8 Claims. (Cl. 260—465)

The present invention relates to a new process for the manufacture of aromatic nitriles, and, more particularly, it relates to a new process for the manufacture of aromatic nitriles by reacting an aromatic halogen containing compound with hydrogen cyanide at a temperature of between about 400° and about 1000° C. in the vapor phase in the presence of a metallic catalyst.

Copper, copper containing alloys, silver and silver alloys have proved to be especially suitable as contact material. The use of alloys may be more advantageous than the use of pure metals. On using brass, for instance, the reaction temperature may be lower by 50–100° C. than in the case of pure copper. Cupromanganese which exhibits the same contact action has, furthermore, the advantage of less scaling and higher resistance to corrosion. Aluminum bronze containing, for instance, 5–10% of aluminum and tombac containing, for instance, 20% of zinc besides copper can also be used as catalyst. The contact material may find application in form of melts or hollow articles, such as tubes, in granulated, powdered or grainy form or as filings (copper filings). The walls of reaction vessels are also suited to acting in the way described. The reaction vessel, however, if filled with contact material in form of small pieces or granules etc., may also have non-metallic, heat-resisting walls.

It is a feature of our invention to provide temperatures which lie within the range wherein the energy binding the halogen to the hydrocarbon is decreased or discontinued and the binding energy of the CN-radical to the C-atom becomes greater than that of the halogen. It follows herefrom that temperatures can vary in wide limits. By regulating temperature in an appropriate manner aromatic hydrocarbons containing several halogen atoms can be converted in steps into nitrile halides or can completely be converted into di-, tri- etc. nitriles. For instance, as an essential ingredient of the crude product obtained from one of the three dichlorobenzenes, a chlorobenzonitrile is formed at 700° C., a benzodinitrile is formed at 800° C. and higher temperatures. Temperature further depends on the position of the haloegen atoms to each other in the nucleus with aromatic hydrocarbons containing several halogen atoms. Temperatures required for the new process generally lie between 400° and 1000° C. Higher temperatures allow one to achieve higher reaction velocities.

The addition of hydrogen to the vaporous starting material contributes to maintaining the action of the catalysts. Inert gases may find application as diluting agents for the vapors or gases respectively.

The crude products obtained according to our new process are purified by washing and/or distilling and the pure product is isolated if desired.

Hydrogen halide formed as a by-product during reaction can also be separated by usual working up processes and can economically be made use of. For instance, when starting from chlorinated hydrocarbons, the hydrogen chloride set free can be obtained up to a high concentration in a receiver filled with water and can be used for saponifying nitriles to acids.

The invention is further illustrated by the following examples without being restricted thereto, the parts being by weight:

Example 1

162 parts of α-chloro naphthalene and 40 parts of hydrogen cyanide (100 per cent) are caused to react at 450° C. in a glass tube filled with copper filings. The vaporous reaction products obtained by this reaction are condensed in a receiver to a brownish liquid. The crude product obtained amounts to 142 parts. After purifying by vacuum distillation the product contains 2.1 per cent of N which corresponds to a yield of about 23 per cent of naphthonitrile.

If temperature in the reaction vessel is raised to 650° C. and copper is replaced by brass, there is obtained, after washing and fractionating, a pure naphthonitrile which melts at 37° C. Yield: 50 per cent of theory.

If the vapor mixture from α-chloro naphthalene and hydrogen cyanide is passed through an open copper tube previously heated to 800° C. the yield amounts to 65–70 per cent.

On working up the crude products, besides naphthonitrile, unchanged chloro naphthalene is found, also naphthalene if reaction temperatures lie above 700° C.

Example 2

A copper contact tube is heated to 700–750° C. while heating, hydrogen is introduced in order to provide a pure metal surface of contact. Thereafter, vapors from 1100 parts of o-dichlorobenzene mixed with an excess of hydrogen cyanide are passed in 60 minutes through the tube. For taking up the vapors and simultaneously prewashing, a water filled receiver is connected with the tube. The crude product—1000 parts—consisting of a brown liquid is washed with water until a neutral product is obtained, dried with calcium chloride and subjected to a fractional distillation.

Besides the starting material, in the fractions between 105–120° C. 333 parts of o-chloro benzonitrile (melting point: 45° C.) and, in the residue 84 parts of phthalodinitrile (melting point: 140° C.) are isolated.

By the reaction of o-dichlorobenzene and hydrogen cyanide at 800° C. a solid crude product is obtained which, after purifying by recrystallization from alcohol, yields a pure phthalodinitrile which melts at 140° C.

In accordance with the foregoing reaction terephthalic acid nitrile is obtained from p-dichlorobenzene and isophthalic acid nitrile from m-dichlorobenzene.

*Example 3*

By passing the vapors from 580 parts of monochloro diphenyl mixed with hydrogen cyanide over cupromanganese (1–2% Mn) filings, 400 parts of a dark brown crude product are formed from which, after washing with water, drying with calcium chloride, fractional vacuum distillation and saponification of the nitrile formed, 330 parts of diphenyl-4-carboxylic acid are obtained.

*Example 4*

The vapors from 1225 parts of 1.2.4-trichlorobenzene mixed with the vapors from 300 parts of hydrogen cyanide are passed through a cupromanganese tube heated to 900°. The solid crude product—1054 parts—thus obtained is dissolved in hot benzene and the solution is decolorized by means of activated charcoal. Out of the solution there crystallize 268 parts of 1.2.4-benzotrinitrile containing as an impurity a small amount of monochlorobenzodinitrile which can be removed by recrystallizing. 299 parts of dichlorobenzonitrile and 195 parts of chlorobenzodinitrile are obtained as by-products.

In an analogous way, 1.2.3-trinitrile and 1.3.5-trinitrile can be obtained.

What we claim is:

1. A process for the manufacture of an aromatic nitrile, which comprises reacting in the vapor phase a nuclear halogenated aromatic compound with hydrogen cyanide at a temperature of between about 400 and about 1000° C. in the presence of a metallic catalyst containing at least one metal of the empirical group consisting of copper and silver.

2. A process for the manufacture of an aromatic nitrile, which comprises reacting in the vapor phase a nuclear halogenated aromatic compound with hydrogen cyanide at a temperature of between about 400 and about 1000° C. in the presence of a metallic catalyst consisting of copper.

3. A process for the manufacture of an aromatic nitrile, which comprises reacting in the vapor phase a nuclear halogenated aromatic compound with hydrogen cyanide at a temperature of between about 400 and about 1000° C. in the presence of a metallic catalyst consisting of a copper alloy.

4. A process for the manufacture of an aromatic nitrile, which comprises reacting in the vapor phase a nuclear halogenated aromatic compound with hydrogen cyanide at a temperature of between about 400 and about 1000° C. in the presence of a metallic catalyst consisting of brass.

5. A process for the manufacture of an aromatic nitrile, which comprises reacting in the vapor phase a nuclear halogenated aromatic compound with hydrogen cyanide at a temperature of between about 400 and about 1000° C. in the presence of a metallic catalyst consisting of a cupromanganese alloy.

6. A process for the manufacture of an α-naphthonitrile, which comprises reacting in the vapor phase α-chloronaphthalene with hydrogen cyanide at a temperature of about 800° C. in the presence of metallic copper.

7. A process for the manufacture of phthalodinitrile, which comprises reacting in the vapor phase o-dichlorobenzene with hydrogen cyanide at a temperature of about 800° C. in the presence of metallic copper.

8. A process for the manufacture of 1.2.4-benzotrinitrile, which comprises reacting in the vapor phase 1.2.4-trichlorobenzene with hydrogen cyanide at a temperature of about 900° C. in the presence of a cupromanganese alloy.

RUDOLF ENGELHARDT.
HANNS ARLEDTER.

REFERENCES CITED

The following references are of record in the file of this patent:

UNITED STATES PATENTS

| Number | Name | Date |
|---|---|---|
| 1,672,253 | Giles | June 5, 1928 |
| 2,477,672 | Webb et al. | Aug. 2, 1949 |